United States Patent [19]

Pilgrim

[11] Patent Number: 4,630,419
[45] Date of Patent: Dec. 23, 1986

[54] BUILDING COMPONENTS

[75] Inventor: Thomas A. Pilgrim, Edwalton, England

[73] Assignee: BPB Industries Public Limited Company, London, England

[21] Appl. No.: 724,464

[22] Filed: Apr. 18, 1985

Related U.S. Application Data

[63] Continuation of Ser. No. 373,676, Apr. 30, 1982, abandoned.

[30] Foreign Application Priority Data

May 1, 1981 [GB] United Kingdom ............... 8113483

[51] Int. Cl.⁴ .................. E04C 3/30; E04C 3/34; E04C 2/06
[52] U.S. Cl. .................. 52/309.13; 52/727; 52/729; 52/DIG. 7
[58] Field of Search ............ 52/727, 729, DIG. 7, 52/309.13

[56] References Cited

U.S. PATENT DOCUMENTS

| | | |
|---|---|---|
| 2,657,153 | 10/1953 | Russell . |
| 2,805,448 | 9/1957 | Rubenstein . |
| 2,850,890 | 9/1958 | Rubenstein . |
| 3,487,518 | 1/1970 | Hopfeld . |
| 3,654,018 | 4/1972 | Bogue et al. . |
| 3,753,849 | 8/1973 | Duff . |
| 3,778,949 | 12/1973 | Hellerich .................. 52/309.16 |
| 3,984,266 | 10/1976 | Christensen et al. . |
| 4,019,301 | 4/1977 | Fox . |
| 4,177,306 | 12/1979 | Schulz et al. . |
| 4,242,406 | 12/1980 | El Bouhnini et al. . |
| 4,327,536 | 5/1982 | Ascher . |

FOREIGN PATENT DOCUMENTS

| | | |
|---|---|---|
| 14658 | 9/1980 | European Pat. Off. . |
| 53-135125 | 11/1978 | Japan . |
| 736257 | 9/1955 | United Kingdom . |
| 1068772 | 5/1980 | United Kingdom . |
| 2038701 | 7/1980 | United Kingdom . |
| 2053779A | 2/1981 | United Kingdom . |

*Primary Examiner*—Alfred C. Perham
*Attorney, Agent, or Firm*—Birch, Stewart, Kolasch & Birch

[57] ABSTRACT

The invention relates to building components, for example studs for supporting wall boards, made of a plaster-resin mixture, with a fibrous sheet embedded near the surface. Components according to the invention have excellent fire-resistant properties. Such components can be made by, for example, introducing a plaster-resin slurry into a mould lined with fibrous sheets, and allowing the slurry to set, or they may be made continuously by, for example, passing the slurry and sheets through one or more suitably profiled conveyors, vibration being employed to cause the slurry to penetrate through the sheets. Such components may be of H, C or U section for use as, for example, studs. They can also be used, for example, as ceiling panels or acoustic tiles, for which purposes they may be of hollow or channel form, and be filled with fibrous or other porous material.

14 Claims, 3 Drawing Figures

BUILDING COMPONENTS

This application is a continuation of copending application Ser. No. 373,676 filed on Apr. 30, 1982, now abandoned.

FIELD OF THE INVENTION

This invention relates to components for use in the building industry. They may be suitable, although not exclusively, as supports for panels or wallboards used in cladding walls, ceilings and like structures.

DESCRIPTION OF BACKGROUND ART

In our UK application No. 8017432, published as GB-A-2053779, we have described a building board comprising a core of set cementitious material, such as gypsum, faced on at least one side by a fibrous sheet embedded in the face of the core, and a continuous film of set cementitious material having a higher density and lower porosity than the core extending over the outer face of the sheet. Where the sheet is composed of glass of other mineral fibres, such board has improved performance in fire. When mounted on conventional supports or studs and subjected to fire testing, however, it is found that the structure will eventually deform or collapse owing to deterioration of the supports, while the panels are still intact. Even in the case of steel studs, considerable distortion can occur after a time while the panels themselves remained relatively unharmed.

SUMMARY AND OBJECTS OF THE INVENTION

It is an object of this invention to provide building components having improved fire resistance, which for example, in the form of support members enable the fire resistant capabilities of such building board to be more fully exploited.

In accordance with this invention, a support member or other component for building use comprises a three-dimensional non-planar body composed of a mixture of gypsum and synthetic resin, more especially a thermo-setting or cold hardening resin, together with one or more sheets of inorganic fibres embedded in one or more surfaces of the body.

The preferred form of component, especially when it is to be employed as a support for building boards, comprises a web portion and at least one flange extending at an angle therefrom, usually at right-angles. Convenient profiles include I, L and C or U sections.

In addition to the use of such components as studs, members of channel or hollow section, such as troughs or trays, may be filled with fibrous or porous material and used, for example, as ceiling panels or acoustic tiles. Suitably moulded sections of the materials may also be used as skirting board, architraving and the like.

One example of a building component to which the present invention can be applied is the so-called cove cornice described in UK Pat. No. 736 257, in which the paper strip referred to in this patent may be replaced by, for example, a glass fibre tissue. Other uses of components according to the invention include conduits for pipes and wire, and cladding for structural steelwork.

The building components according to the invention may be made by forcing an aqueous slurry comprising gypsum plaster and resin, under pressure, into a mould lined with one or more sheets of inorganic fibre. Preferably, however, the components are made continuously by advancing a first sheet of the fibres into and along a forming channel having a profile corresponding to part of the profile of the desired support member, continuously feeding the aqueous slurry onto the sheet, continuously applying a further sheet over the slurry, enclosing the forming channel as the assembly of sheets and slurry advances with a closure having a profile corresponding to the remainder of the profile of the support member, vibrating the channel and closure to cause the sheets to penetrate beneath the surfaces of the slurry, and releasing the building component continuously from the channel when it has set.

In components made in this way, the reinforcing fibres are to be found immediately below the surface of the gypsum and resin body, where they exercise the maximum reinforcing effect, while the film of gypsum confers a smooth or desirably textured surface on the body. It is preferable for the film of gypsum to be of minimal thickness, although continuous, and it should preferably not exceed 2 mm. It is particularly preferred that the sheets of inorganic fibre should be non-woven tissues of glass fibres. The even spread of fibres across the entire width of a non-woven tissue gives a continuity of reinforcement in the surface which may be lacking if woven or other fabrics having a relatively large mesh size are employed.

In making the building components according to the invention, it is necessary that both the plaster, usually calcium sulphate hemihydrate and the thermo-setting or cold curing resin should harden. The composition of the slurry should therefore be adjusted to ensure that both these reactions occur at the desired rate. In the case of urea-formaldehyde or other aminoplast resins, curing takes place under acid catalysis.

By-product gypsum can be used for the purposes of the present invention, and where this is derived from phosphoric acid manufacture, residues in such gypsum may serve to catalyse the resin, while a conventional acidic setting accelerator, such as aluminium sulphate, can be added to ensure rapid set of the gypsum. Mineral gypsum, however, may contain a certain amount of carbonate, which tends to neutralise any acid which may be added, so that although plaster made from such gypsum may set, an aminoplast resin precondensate present in the slurry may not. In these circumstances, additional additives may be employed to ensure setting of both components, for example, a combination of aluminium chloride or sulphate will accelerate the plaster set, and an organic acid such as citric acid will help to control the resin set.

The preferred gypsum and resin composition for use in components according to the invention comprises from 100 parts to 300 parts hemihydrate plaster and 70 parts to 120 parts thermosetting resin, by weight. Such a composition may additionally contain up to 5 parts chopped glass fibres or additional reinforcement, and fillers such as exfoliated vermiculite or expanded perlite.

In manufacturing the components, the aqueous slurry preferably contains from 100 parts to 300 parts hemihydrate plaster, from 40 parts to 75 parts (solids) thermosetting resin precondensate, by weight, together with customary percentages of setting accelerators or other additives.

The resin used may be, for example, an epoxy or a phenolic resin, or it may be an aminoplast resin such as ureaformaldehyde. Epoxy and phenolic resins render the finished building component impervious to water, and are therefore most suited for use in components which are required to be load-bearing.

BRIEF DESCRIPTION OF THE DRAWINGS

The invention will further be described, by way of example, with reference to the accompanying drawings, in which.

DETAILED DESCRIPTION OF THE INVENTION

Figure 1:
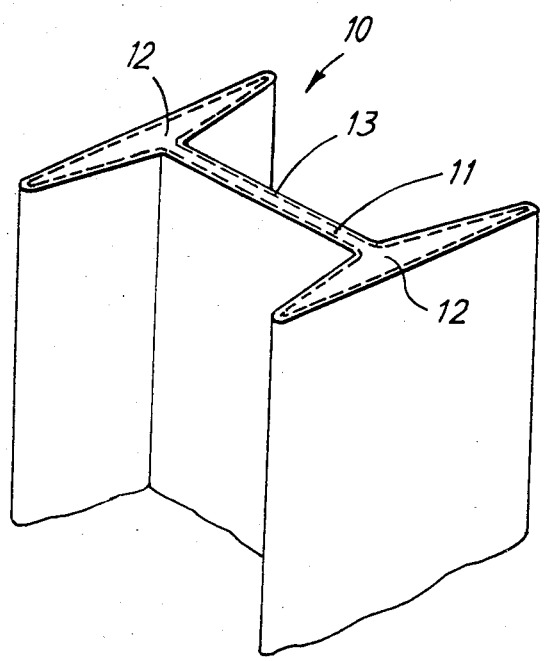
FIG. 1 is a perspective view of one example of a building component embodying the invention.

A support member or stud 10 for wallboards is shown in FIG. 1 and comprises a web portion 11 and two opposed flange portions 12 extending at right-angles from the longitudinal edges of the web portion. Such members can be manufactured continuously by the method described below, and cut into suitable lengths for use.

The stud is preferably composed of about 80% by weight gypsum and about 20% urea-formaldehyde resin, with glass fibre tissues 13 extending beneath the surface of the composition on at least the external faces of the stud. Preferably only a thin film of the composition extends over the tissue, providing a smooth surface to the stud. Preferred tissues for this purpose are resin-bonded non-woven tissues of glass fibre having a weight per unit area of from 60 gm$^{-2}$ to 120 gm$^{-2}$ and composed of glass fibres of diameter 10 um to 20 um.

Figure 2:
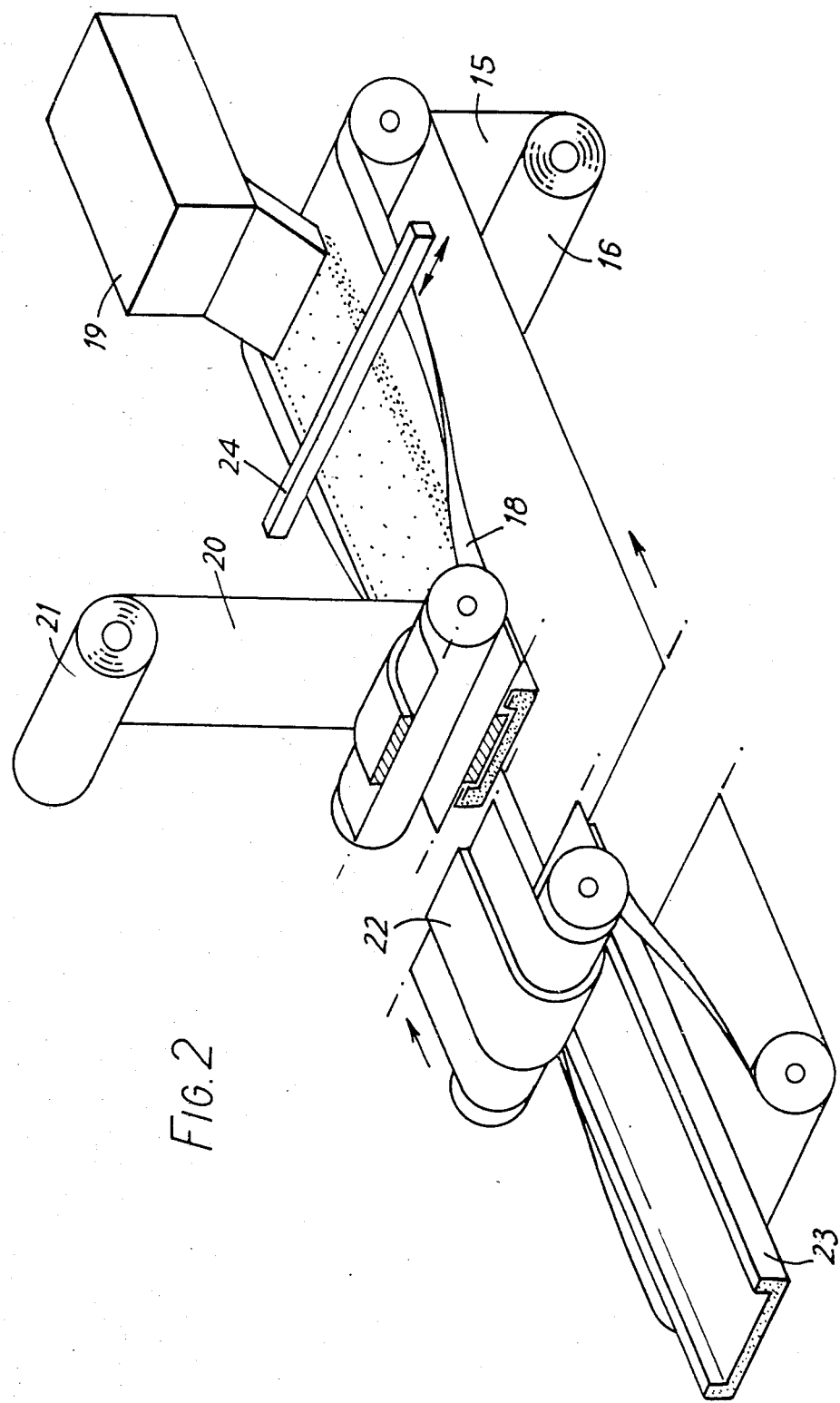
FIG. 2 is a diagrammatic illustration of one example of a plant for manufacturing components according to this invention.

Continuous manufacture of the stud member shown in FIG. 1 may be achieved by, for example, the following method, using apparatus shown diagrammatically in FIG. 2.

A sheet of inorganic fibres 15, supplied by a reel 16, advances along a lower belt conveyor, the edges of which at 18 are turned upward to form a trough having a profile corresponding to the lower part of the profile of the member being produced. Onto this sheet is poured a plaster and resin slurry from a continuous mixer 19. The slurry is evenly distributed on the sheet by a reciprocating spreader bar 24. A second sheet of inorganic fibres 20, again supplied by a reel 21, is drawn by a continuous belt 22 onto the surface of the slurry. Belt 22 has a profile corresponding to the remaining profile of the produced member. As the assembly of sheets and slurry passes along the trough region 18 beneath the belt 22 it hardens to a condition in which it can safely be handled. The member 23 is then released continuously from the conveyors and cut into convenient lengths.

Figure 3:
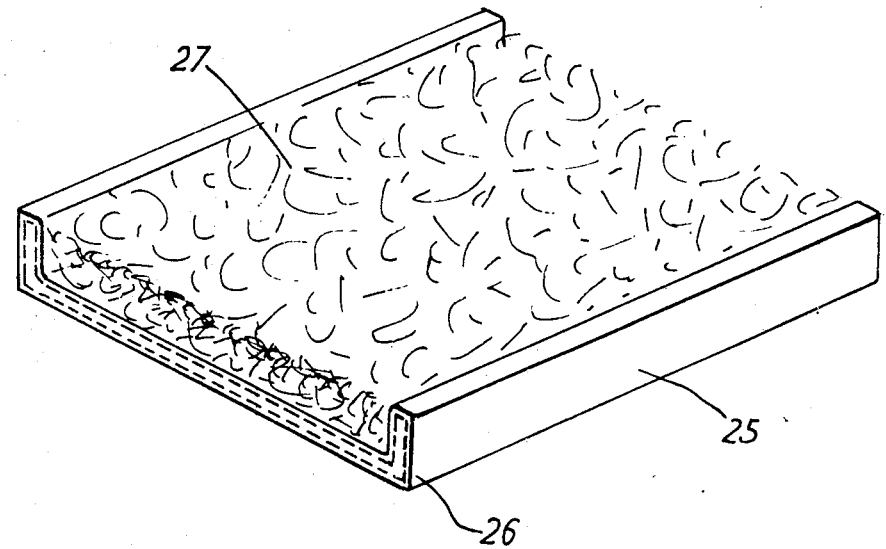
FIG. 3 is a perspective view of another example of a component embodying the invention.

In one example of the production of studding as described, the sheets employed are of resin-bonded non-woven glass tissue as described above. The slurry employed is composed of:

Hemi-hydrate plaster: 200 parts by weight
Urea-formaldehyde resin: 100 parts by weight
Aluminium sulphate: 5 parts by weight
Water: 34 parts by weight A further example of an application of this material is a ceiling panel as shown in FIG. 3. A channelled or hollow sectioned member 25, having a fibre sheet 26 embedded just below the surface contains fibrous or other porous material 27 in the channel. The fibrous material serves as thermal insulation, and in a suitable structure may confer acoustic absorbency properties.

What is claimed is:

1. A building component comprising:
   an integral body of angulate, channel or hollow cross section, said body comprising a mixture of gypsum and resin; and
   at least one sheet of inorganic fibres, each such sheet being embedded and completely surrounded in said body immediately below a surface thereof;
   a continuous thin film of said gypsum and resin mixture of said body located on an exterior surface of said building component while being integral with said body and embedding and completely surrounding said sheet.

2. A building component according to claim 1 in which said at least one inorganic fibre sheet constitutes a layer which extends around the entire lateral periphery of the said body.

3. A building component according to claim 2 in which the or each sheet of inorganic fibres is a non-woven tissue of glass fibre.

4. A building component according to claim 1 having a section making it suitable for use as a skirting member.

5. A building component according to claim 1, in which said resin is selected from the group consisting of thermo-setting resins and cold-setting resins.

6. A building component according to claim 5 in which said resin is urea-formaldehyde.

7. A building component according to claim 5, in which said resin is phenol-formaldehyde.

8. A building component according to claim 5, in which said resin is a water dispersed epoxy resin.

9. A building component according to claim 1, in which said mixture contains chopped glass fibres.

10. A building component according to claim 1, in which said mixture contains an aggregate.

11. A building component according to claim 10 in which said aggregate is selected from the group consisting of exfoilated vermiculite and expanded perlite.

12. A building component for use as a stud member for support building panels or boards comprising:
    an elongate web;
    two flanges, said flanges extending from respective longitudinal edges of said web substantially perpendicular to the plane of said web;
    said web and said flanges being composed of a mixture of gypsum and resin; and
    at least one sheet of inorganic fibres, each such sheet being embedded and completely surrounded in said web and said flanges immediately below a surface thereof;
    a continuous thin film of said gypsum and resin mixture of said web being located on an exterior surface of said building component while being integral with said body and embedding and completely surrounding said sheet.

13. A building component for use as a ceiling or like panel comprising:
    a web of rectangular plan;
    at least two flanges, said flanges extending along respective edges of said web in the same direction and substantially perpendicular to the plane of said web;
    said web and said flanges being composed of a mixture of gypsum and resin; and
    at least one sheet of inorganic fibres, each such sheet being embedded and completely surrounded in said web and said flanges immediately below a surface thereof;

a continuous thin film of said gypsum and resin mixture of said web located on an exterior surface of said building component while being integral with said body and said embedding and completely surrounding said sheet.

14. A building component according to claim 13 further comprising a body of fibrous or porous material, said body of material being contained by said web and said flanges.

* * * * *